United States Patent [19]

Gotoh

[11] 4,428,548
[45] Jan. 31, 1984

[54] MAGNETIC RECORDING TAPE CARTRIDGE

[75] Inventor: Shinichi Gotoh, Kyoto, Japan

[73] Assignee: Hitachi Maxell, Ltd., Osaka, Japan

[21] Appl. No.: 287,801

[22] Filed: Jul. 28, 1981

[30] Foreign Application Priority Data

Jul. 28, 1980 [JP] Japan .......................... 55-105610[U]

[51] Int. Cl.³ .......................... G03B 1/04; G11B 15/13
[52] U.S. Cl. ..................................... 242/199; 242/197
[58] Field of Search ........................ 242/192, 197–200,
242/55.19 A; 360/93, 96, 132; 225/4, 79;
352/72–78; 220/4 B, 4 E

[56] References Cited

U.S. PATENT DOCUMENTS

| | | | |
|---|---|---|---|
| 3,600,070 | 8/1971 | Downey | 352/72 |
| 3,836,096 | 9/1974 | Fukushima et al. | 360/132 |
| 3,900,170 | 8/1975 | Serizawa | 360/96.6 X |
| 4,126,283 | 11/1978 | Kawachi | 242/199 |
| 4,173,319 | 11/1979 | Umeda | 360/132 X |
| 4,191,984 | 3/1980 | Tsukidate et al. | 360/132 |
| 4,214,719 | 7/1980 | Kato | 242/198 |
| 4,235,395 | 11/1980 | Wardenaar et al. | 360/132 X |
| 4,254,922 | 3/1981 | Wolf et al. | 360/132 |
| 4,285,020 | 8/1981 | Sato | 360/132 |

Primary Examiner—Leonard D. Christian
Attorney, Agent, or Firm—Birch, Stewart, Kolasch & Birch

[57] ABSTRACT

A magnetic recording tape cartridge having a top section and a bottom section, each assembled together by means of tapping screws to provide a tape chamber in which a pair of tape reels for winding a magnetic recording tape is contained with one of the tapping screws adapted to be engaged with a boss located on the central portion of the cartridge near the tape reel. The cartridge comprises a partition wall member situated between the tape reels and the boss located in the central portion so that scraps produced from the boss during tapping of the screw into the boss are prevented from entering onto the magnetic recording tape.

4 Claims, 43 Drawing Figures

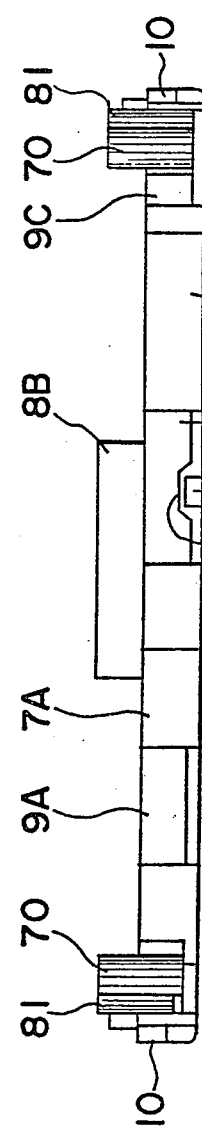
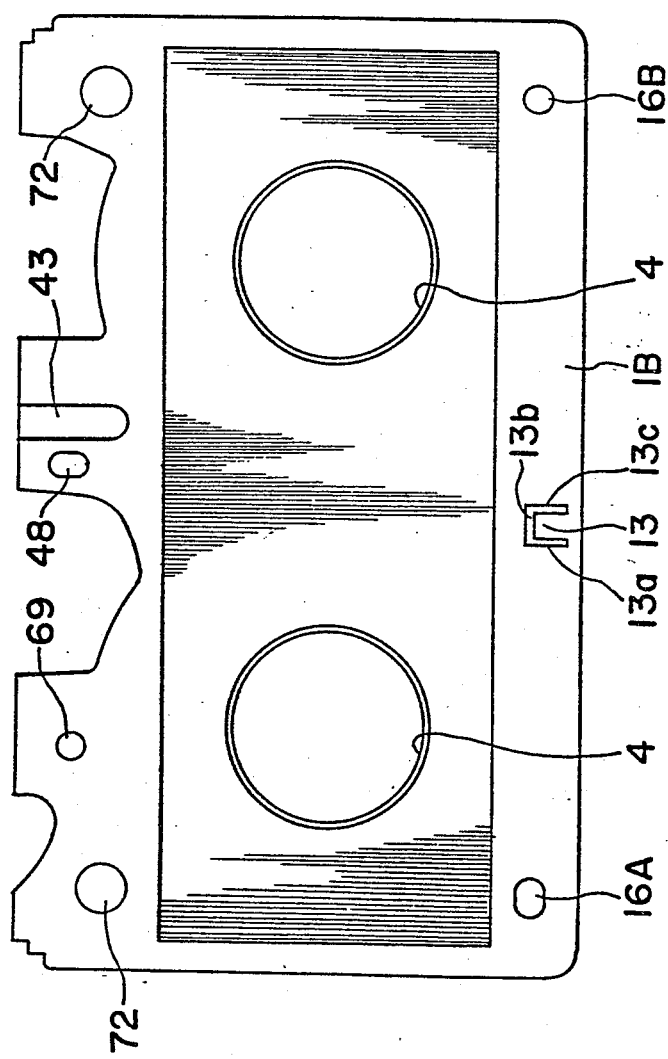
Fig. 5
Fig. 6

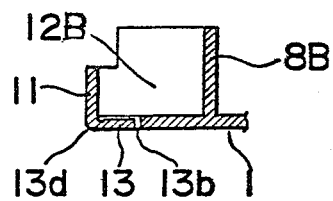
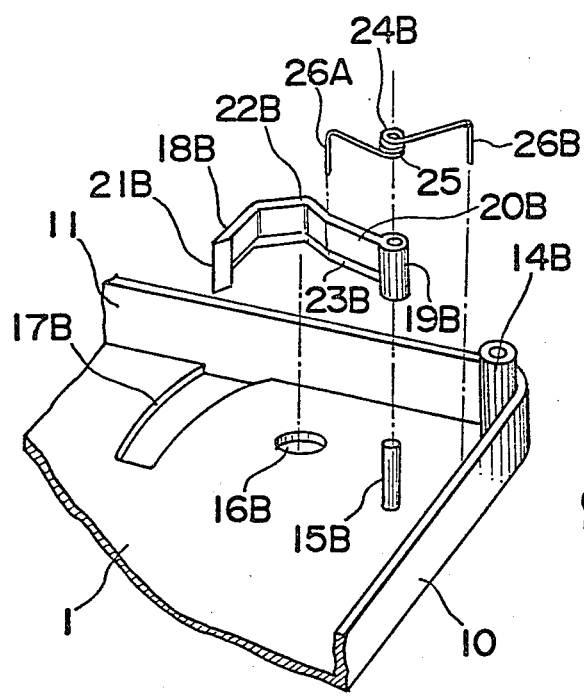
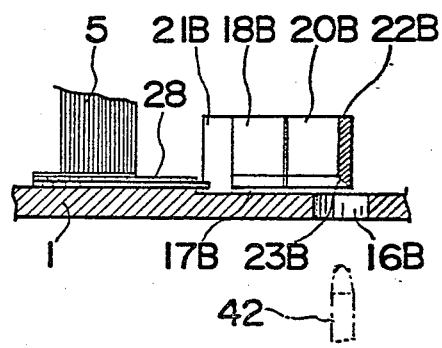
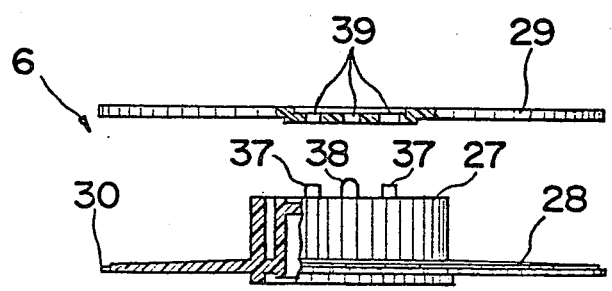
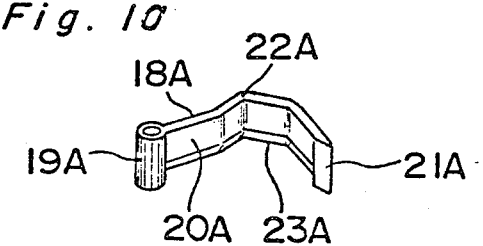

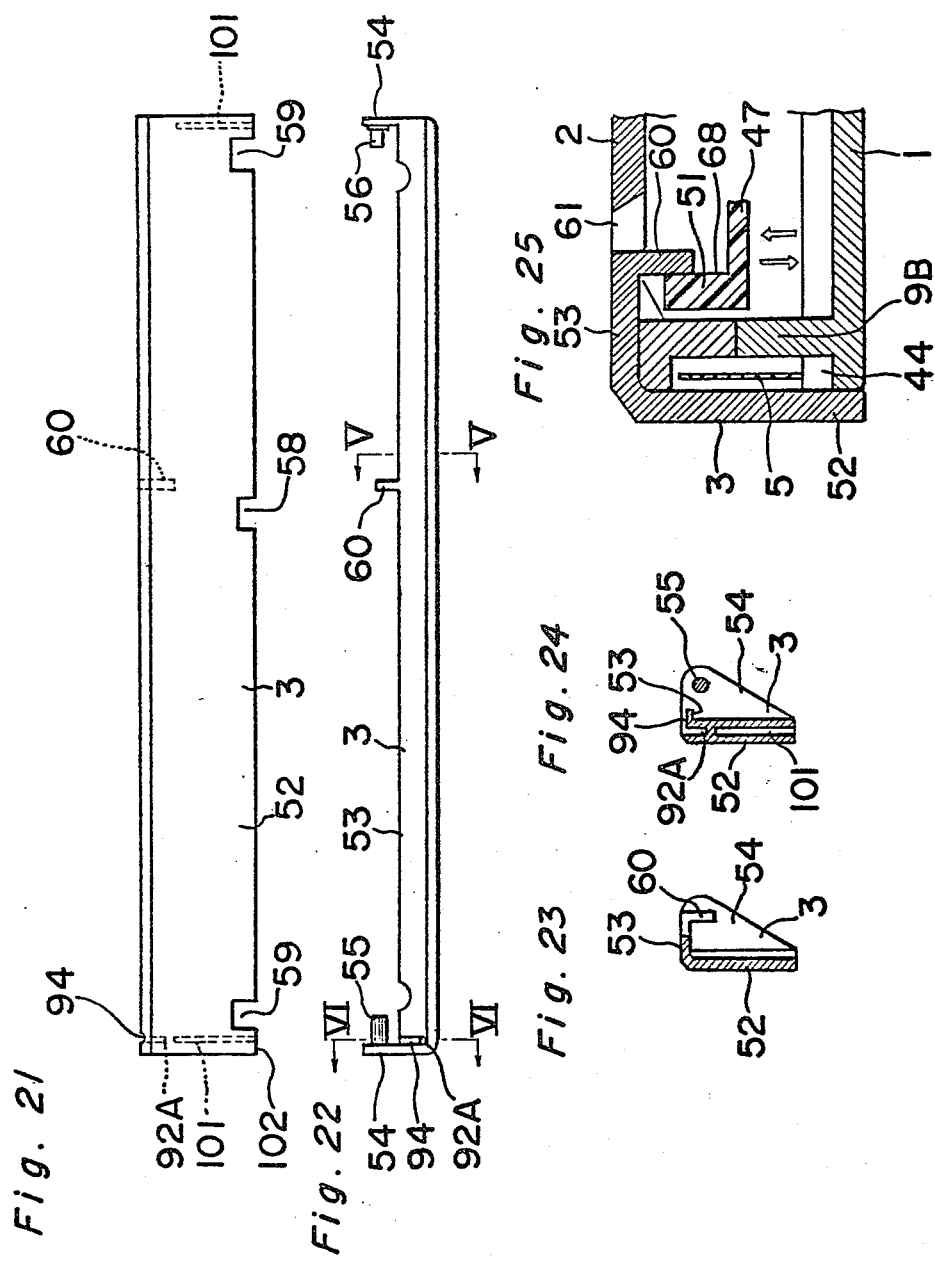

Fig. 41
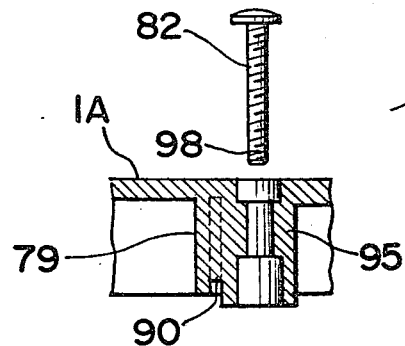
Fig. 42
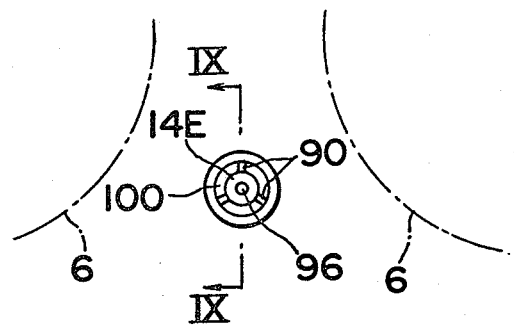
Fig. 43
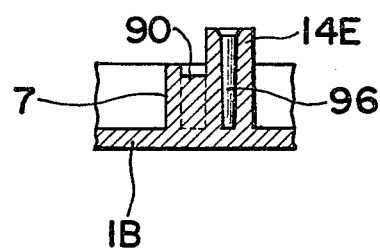
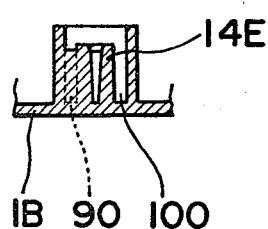

4,428,548

MAGNETIC RECORDING TAPE CARTRIDGE

FIELD OF THE INVENTION

The present invention relates to a magnetic recording tape cartridge, and in particular, it relates to a magnetic recording tape cartridge comprising a cartridge case composed of a top section and a bottom section and reels contained in the cartridge case for winding a magnetic recording tape, and wherein both the bottom section and the top section are fastened together by means of tapping screws.

BACKGROUND OF THE INVENTION

In a magnetic recording tape cartridge of the type mentioned above, each of the screws is passed through a corresponding hole defined in the respective corners of the top section and in turn are screwed into a corresponding recess defined in a boss projectingly formed on the bottom section so that the top and the bottom sections are securely assembled together. In a case where the top and bottom sections are fastened together only by four screws located in the respective corners of the cartridge case, the top plate of the top section and the bottom plate of the bottom section in the intermediate portion thereof tend to be easily deformed, whereby the gap between the top plate and the bottom plate in the intermediate portion of the cartridge case becomes larger than the gap in the respective corners of the cartridge case resulting in separation of various portions, such as partition walls of the both sections which should be abutted together at their top and bottom ends in a normal state.

In order for prevention of the drawbacks, it is well known to provide a similar screw fastening means as provided in the corner in the central portion of the cartridge case so as to maintain the gap between the top and bottom plates uniform. On the other hand, there are produced scraps of synthetic resin when the tapping screws are screwed into the corresponding holes.

In the conventional magnetic recording tape cartridge, such scraps easily stick to the recording tape due to static electricity occurring on the recording tape caused by friction between the recording tape and various related components in the cartridge case, resulting in lowering the recording and/or reproducing characteristics thereof. These undesired effects remarkably occur from the scraps produced from the boss in the central portion of the cartridge case since the same is located near and between the pair of tape reels.

Accordingly, an essential object of the present invention is to provide a magnetic recording tape cartridge comprising a partition wall for preventing scraps produced during screwing of a screw into a screw fastening boss located in the central portion of the cartridge case from coming into contact with the magnetic recording tape thereby resulting in prevention of the sticking of the scraps onto the magnetic recording tape.

BRIEF EXPLANATION OF THE DRAWINGS

FIG. 5 is a front elevational view of a bottom section of the magnetic recording tape cartridge;

FIG. 6 is a bottom plan view of the bottom section of FIG. 5;

FIG. 7 is a cross sectional view taken along the line I—I in FIG. 4;

FIG. 8 is an exploded perspective view of a member for preventing rotation of the reels;

FIG. 9 is a partial cross sectional view of the member of FIG. 8;

FIG. 10 is a perspective view of the member for preventing rotation of the reels as disposed in the left-hand direction;

FIG. 11 is a partially fragmentary exploded front elevational view of the reel;

FIG. 21 is a front elevational view of the rotatable lid member;

FIG. 22 is a top plan view of the rotatable lid member;

FIG. 23 is a partial cross sectional view taken along the line V—V in FIG. 22;

FIG. 24 is a cross sectional view taken along the line VI—VI in FIG. 22;

FIG. 25 is an enlarged cross sectional view of a principal part of the rotatable lid member in which the lid member is closed;

FIG. 41 is an enlarged cross sectional view of the principal part of the cartridge case illustrating engagement of the top and bottom sections;

FIG. 42 is a top plan view of a boss in another embodiment of the present invention; and FIG. 43 is a cross sectional view taken along the line IX—IX in FIG. 42.

DESCRIPTION OF THE PREFERRED EMBODIMENT

Figure 1:
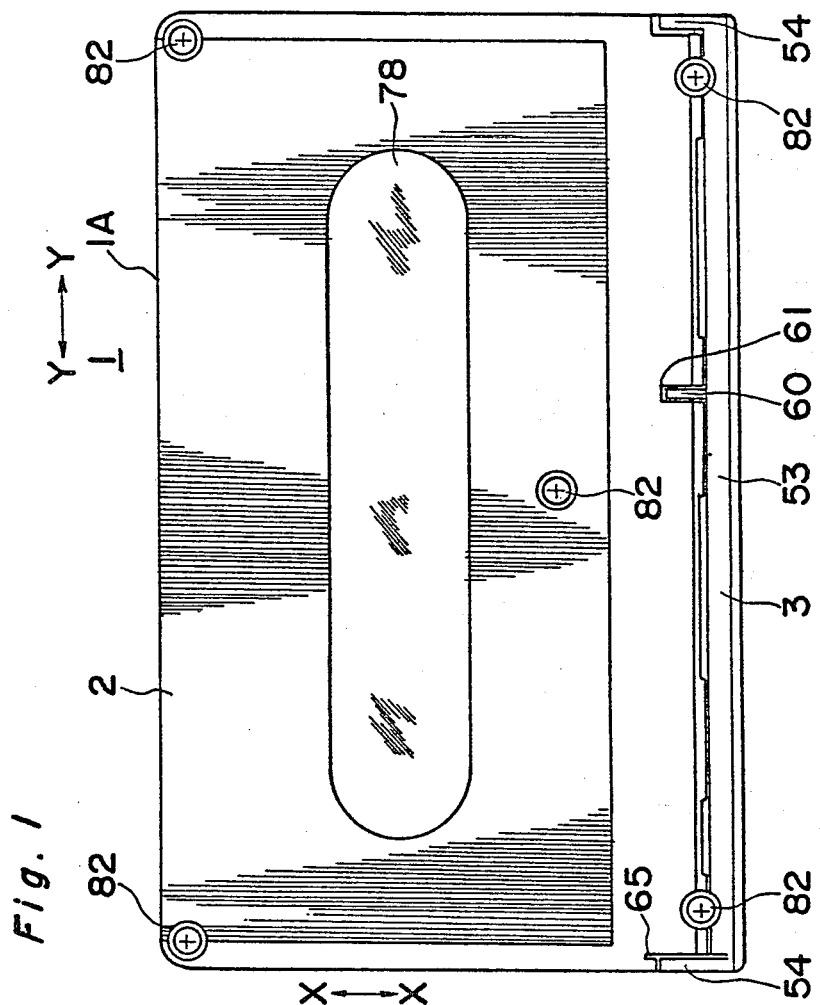
FIG. 1 is a top plan view of a magnetic recording tape cartridge according to the present invention.
Figure 2:
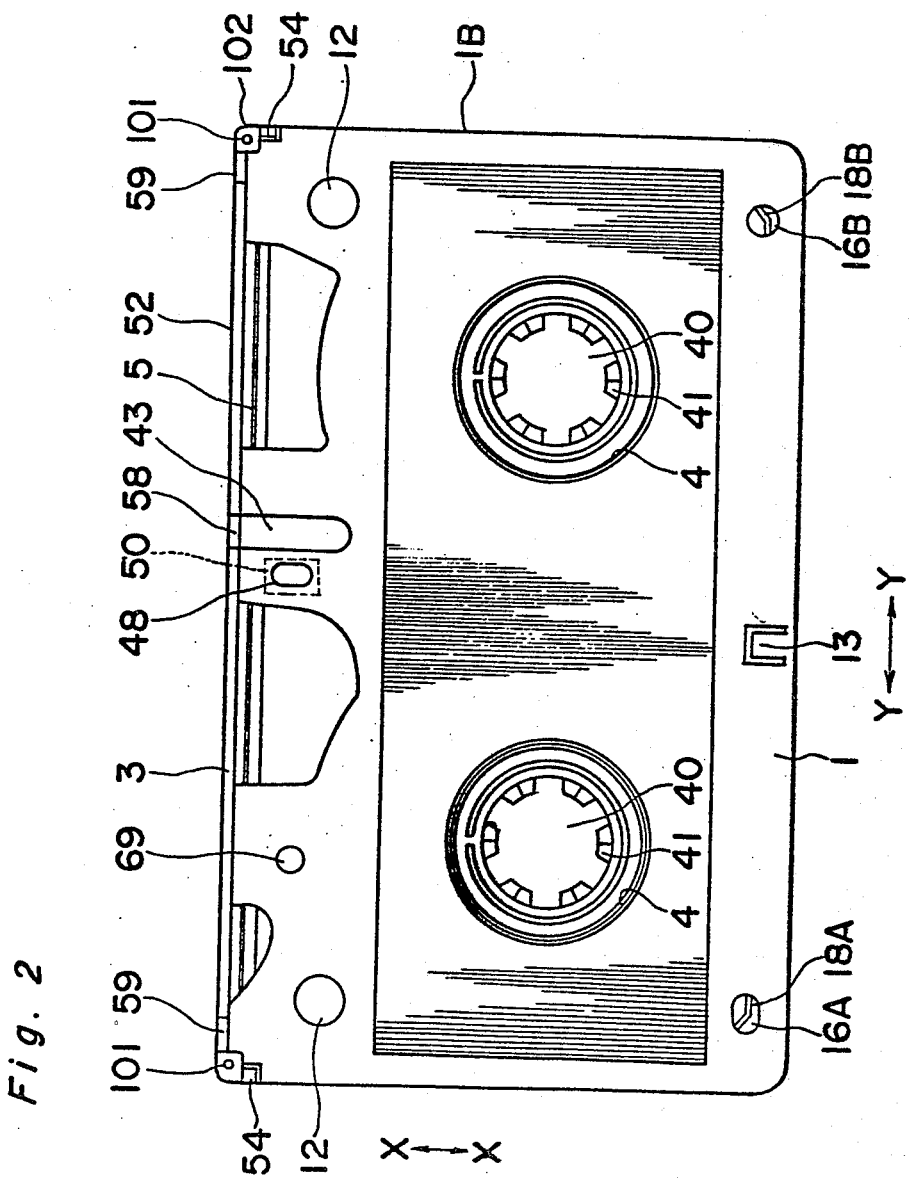
FIG. 2 is a bottom plan view of the magnetic recording tape cartridge of FIG. 1.
Figures 3, 4:
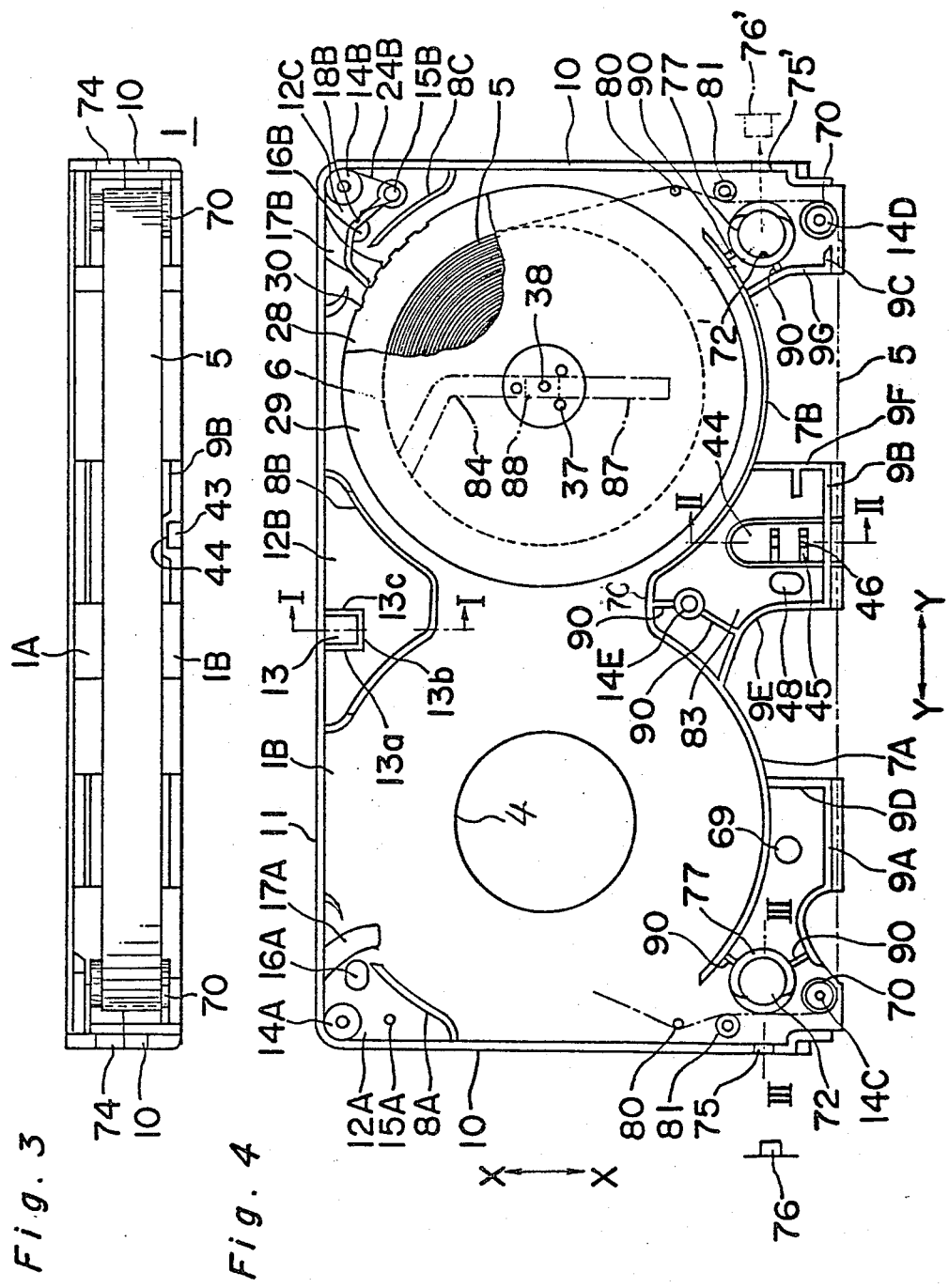
FIG. 3 is a front elevational view of the magnetic recording tape cartridge with a rotatable lid member removed.
FIG. 4 is a top plan view of a bottom section of the magnetic recording tape cartridge with one of the reels mounted.

Referring now to FIGS. 1 to 3, there is seen a magnetic recording tape cartridge of the present invention comprising a case generally designated 1 composed of a top section 1A, a bottom section 1B, and an elongated lid member 3 rotatably mounted on the front portion of the top section 1A, each portion being made of a plastic material, such as polystyrene resin.

As shown in FIGS. 4 and 6, the bottom section 1B is provided at the generally central portion relative to a longitudinal direction X of the case 1 with a pair of through-holes 4 at a predetermined space relative to a lateral direction Y of the case 1 for receiving drive shafts of a recording/reproducing apparatus. A pair of reels 6 for winding a magnetic recording tape 5 are respectively rotatably mounted in the through-holes 4. Around the reels 6, there are provided front inner walls 7A and 7B and rear inner walls 8A, 8B and 8C respectively defining some clearances between the same and the outer peripheries of the reels 6, and the inner walls 7 and 8 are integrally formed with the bottom section 1B.

The respective inner walls 7A, 7B, 8A, 8B and 8C are provided for restricting the position of the pair of tape reels 6 in position with the additional function of preventing dust or scraps from the outside from entering the cartridge case 1. Furthermore, the front inner walls 8A and 8B also serve to prevent jamming of the magnetic recording tape 6 which occasionally might occur in a case where the recording tape is loosened from the roll of the recording tape on the tape reel during fast running thereof such as a rewinding motion.

Each of the front inner walls 7A and 7B is formed by an arcuate wall conforming to part of the circular edge of the reels 6 and the front inner walls 7A and 7B are connected with each other by an intermediate wall 7C. The intermediate portion of the left side front inner wall 7A is connected with the right end portion of the front outer wall 9A by means of a connecting wall 9D extending in the longitudinal direction X straightly.

The left side front inner wall 7A is also connected with the left end portion of the intermediate front wall 9B by an arcuate connecting wall 9E, and the intermediate portion of the right hand side front inner wall 7B is connected with the right end of the intermediate front wall 9B by a connecting wall 9F so as to define a chamber for the accommodation of a lid locking device, the details of which will be described hereinafter.

As shown in FIG. 4, the bottom section 1B is provided in both end portions of the front surface with a pair of bosses 14C and 14D having holes for engaging respectively with fastening screws and in the substantially central portion of the front surface forward of the junction of the front inner walls 7A and 7B with a similar boss 14E. Each of the bosses 14A to 14E are provided with holes of which the inner diameter is slightly smaller than the diameter of the fastening screws, so that each of the bosses is tapped by the fastening screw.

The boss 14E in the bottom section 1B is different from the other bosses 14A to 14D, in that it is provided between the two reels 6, and is relatively near thereto.

The respective inner walls 7A, 7B, 7C and walls 9E, 9F and 9B and the bosses 14A to 14E have the height equal to the height of the side walls 10, i.e., a half of the thickness of the cartridge case 1.

Figure 30:
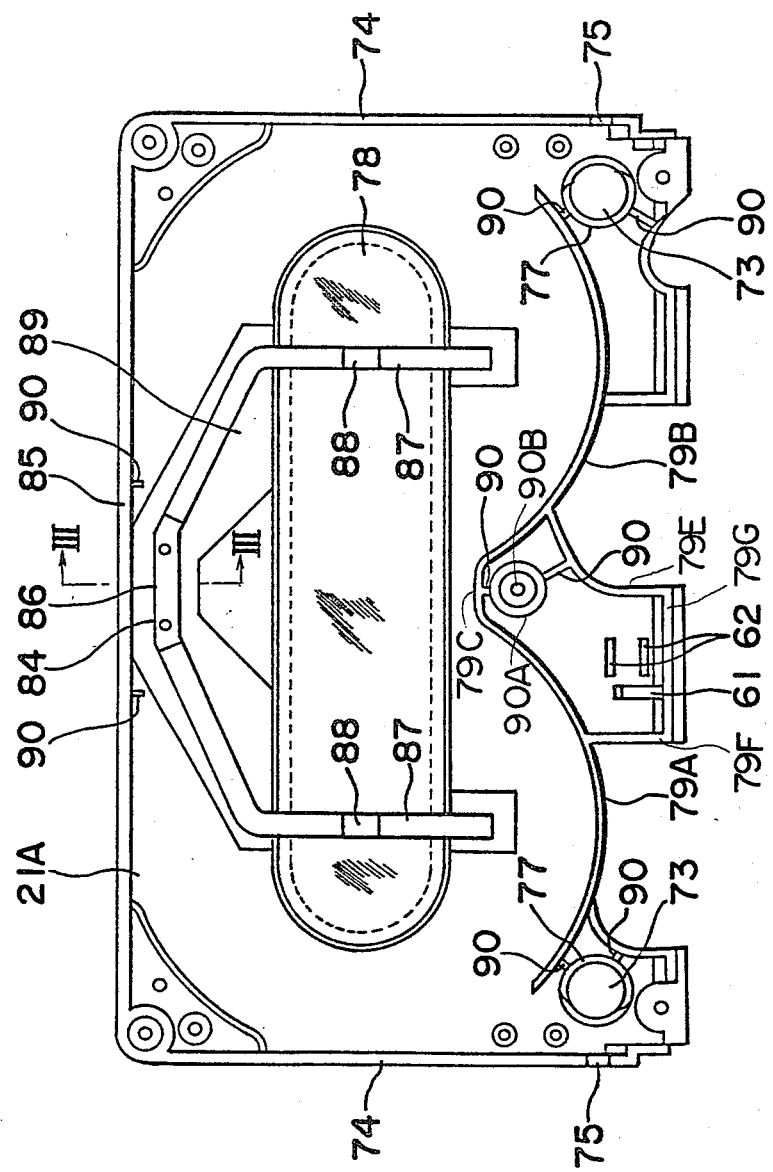
FIG. 30 is a bottom plan view of the top section.

The top section 1A is also provided with the inner walls 79A, 79B and 79C similar to the walls 7A to 7C in the bottom section 1B (see FIG. 30). The top section 1A is further provided with the connecting walls 79E and 79F connecting with the front wall 79G and the inner walls 79A and 79B, the shape of which is similar to the connecting walls 9E and 9F of the bottom section 1B. The height of the respective walls in the top section have a height equal to the height of the side walls 74 of the top section, i.e., a half of thickness of the cartridge case 1. The top section 1A is further provided with a boss 90A formed in the position corresponding to the central boss 14E of the bottom section 1B with a through-hole 90 defined to allow a fastening screw to pass.

By this arrangement, when the top section 1A is assembled with the bottom section 1B to form a cartridge case 1, the respective ends of the walls 7A to 7C and 79A to 79C are abutted and the ends of the walls 9B, 9E and 9F are abutted to the ends of the walls 79G, 79E and 79F respectively to close the chamber 83 with the bosses 14E and 90A enclosed therein. Also the end of the boss 14E of the bottom section 1B is engaged with the end of the boss 90A of the top section 1A. It tends to occur that when a tapping screw 82 is threadedly engaged with the boss 14E during assembling of the top and bottom sections 1A and 1B, scraps of synthetic resin can possibly enter the interior of the cartridge case through a clearance in the juncture of the top and bottom sections 1A and 1B to damage the magnetic recording tape 5. To prevent this, as mentioned above, the front inner walls 7A and 7B are elongated and connected at a position between the boss 14E and the peripheral edge of the reels 6 so that the boss 14E is enclosed in a chamber 83 defined by the front inner walls 7A, 7B, 79A and 79B, the front walls 9B, 79G and the connecting walls 9E, 9F, 79E and 79G, whereby the boss 14E is separated from the reels 6.

Therefore, when the tapping screw passed through the hole 90B is forced to be engaged within the hole of the boss 14E during assembling of the top section and the bottom section, even if scraps of synthetic resin are produced from the boss 14E, the scraps are effectively enclosed within the chamber 83 so that the scraps cannot damage the magnetic recording tape.

It is noted that in this embodiment, each of the bosses 14E and 90A is connected with the walls 7C and 9E and 79C and 79E by connecting walls 90 and the bosses and the walls can be reinforced.

In FIGS. 42 and 43, there is shown another embodiment of the present invention in which a circumferential partition wall 99 is integrally formed on the bottom section 1B to encircle the entire outer periphery of the boss 14E and a groove 100 is defined between the boss 14E and the circumferential wall 99 for collecting the scraps of synthetic resin. In this embodiment, the top section 1A is also provided on the inner surface of the top plate with another circumferential partition wall coming in contact with the top end of the circumferential wall 99 of the bottom section 1B so as to isolate the central boss 14E from the region occupied by the tape reel, thereby causing the scraps produced during screwing the fastening screw into the boss 14E to be enclosed in the chamber encircled by the partition wall 99. Thus, the magnetic recording tape is kept clean avoiding the problem of the scraps of synthetic resin sticking to the tape. In this embodiment, as the partition wall and the boss are integrally connected with each other, the mechanical strength of the boss can advantageously be increased. In addition, during molding of the respective sections, flow of the synthetic resin in the mold is improved, so that the magnetic recording tape cartridge is prevented from being deformed when removed from the mold after forming, and thus the top and bottom sections of the cartridge case can be reliably assembled together.

In this embodiment, the top and bottom sections 1A and 1B are also respectively provided with reinforcing ribs 90 for improving the shock-proof property of the boss 14E and the shield wall 77 and preventing the same from being deformed when the top section 1A and the bottom section 1B are removed from corresponding molds after forming. Provision of the reinforcing ribs 90 further improve fluidity of the synthetic resin within the molds for forming the sections 1A and 1B.

Although the various constructions described hereinafter are not directly related to the present invention, explanation is made merely to make clear the detail of the magnetic recording tape cartridge in which the present invention is employed.

The right side front inner wall 7B is also connected with the front wall 9C through a connecting wall 9G which extends from the right end portion of the front inner wall 7B to the left end of the front wall 9C.

The right side rear inner wall 8C extends from a right side wall 10 to a rear wall 11 to define a chamber 12C having generally triangular shape in plan view for mounting a tape reel locking device in the rear corner of the bottom section 1B.

A similar chamber 12A is also defined in the left side rear corner of the bottom section 1B by the left side rear inner wall 8A.

The rear inner wall 8B having generally V-shaped configuration in plan view has its both ends connected with the rear wall 11 in the intermediate portion thereof to form a central chamber 12B of generally triangular shape in plan view. The central rear inner wall 8B is made higher than the rear wall 11 so that the upper end thereof comes close to the bottom inner surface of the top section 1A upon assembling of the bottom section 1B and the top section 1A.

The bottom section 1B is integrally provided in its bottom surface with an erase preventing member 13 of the magnetic recording tape in the interior of the central chamber 12B for preventing the erroneous erasing of records.

Said erase preventing member 13 is provided in the form of a foldable flap defined by slots 13a through 13c in the bottom face of the bottom section 1B with its one side connected with the foot portion of the rear wall 11 through a thinned portion 13d as shown in FIG. 7 so that the erase preventing member can be easily separated from the bottom section 1B. When the erase preventing member 13 is separated from the bottom plate 1B upon being bent and the member 13 thus separated is received in the chamber 12B, it will neither engage with and damage the magnetic recording tape nor obstruct rotation of the reels 6.

Within a chamber 12A defined by the rear inner wall 8A in the left-hand direction, the side wall 10 and the rear wall 11, there are projected a boss 14A and a pivotal shaft 15A, and there are further defined a slightly elongated through-hole 16A for receiving a standard pin of a recording/reproducing apparatus and an arcuate guide groove 17A arching about the pivotal shaft 15A. Within a chamber 12B defined by the rear inner wall 8C in the right-hand direction, the side wall 10 and the rear wall 11, there are also provided a boss 14B, a pivotal shaft 15B, a circular hole 16B for receiving the standard pin and an arcuate guide groove 17B, all of which are positioned symmetrically with the boss 14A, the pivotal shaft 15A, the elongated hole 16A and the guide groove 17A.

A rotation preventing member 18B for stopping the rotation of the reel 6 is rotatably engaged with the pivotal shaft 15B. The rotation preventing member 18B is formed of synthetic resin having low coefficient of friction, and comprises a sleeve 19B engaged with the outer periphery of the pivotal shaft 15B, a receiving member 20B extending from the outer periphery of the sleeve 19B and a pawl 21B formed in the forward end of the receiving member 20B (see FIG. 8). The lower end of the pawl 21B extends slightly downwardly of the lower ends of the sleeve 19B and the receiving member 20B so that the lower end of the pawl 21B enters the guide groove 17B upon engagement of the rotation preventing member 18B and the pivotal shaft 15B. The receiving member 20B is provided with an L-shaped bent portion 22B in a part which becomes opposite to the elongated hole 16B when the rotation preventing member 18B is engaged with the pivotal shaft 15B. The receiving member 20B is further provided in the inside of its lower end with an inclined portion 23B inclined with an angle of about 30° to 60°.

A rotation preventing member 18A to be engaged with the left-hand pivotal shaft 15A is, as shown in FIG. 10, symmetrical with the aforementioned rotation preventing member 18B, and also comprises a sleeve 19A, a receiving member 20A and a pawl 21A, in which the receiving member 20A is provided with a bent portion 22A in its center and an inclined portion 23A in its lower end.

A spring member 24B formed by a coiled spring is loosely fitted with the pivotal shaft 15B with the interposition of the rotation preventing member 18B therebetween. As shown in FIG. 8, the spring member 24B has in its center an annular portion 25 formed by a plurality of windings, and the free end portions extending from the annular portion 25 are both bent in the longitudinal direction of the annular portion 25 to form elastic free ends 26A and 26B. The annular portion 25 is loosely fitted with the head of the pivotal shaft 15B with the elastic ends 26A and 26B slightly pressed against each other due to the elasticity of the spring member 24B and simultaneously inserted into the clearance between the side wall 10 and the receiving member 20B, and thereafter the elastic ends 26A and 26B are released. Then, by virtue of restoring force of the spring member 24B, the elastic ends 26A and 26B are elastically placed in contact with the outer surface of the receiving member 20B and the inner surface of the side wall 10 respectively, and the pawl 21B of the rotation preventing member 18B is elastically pressed against the reel 6 by the spring member 24B. Such construction simplifies the provision and supporting of the spring member 24B.

As shown in FIG. 11, each of the reels 6 comprises a lower flange 28 having a hub 27 integrally projecting therefrom and an upper flange 29. The lower flange 28 is made of opaque synthetic resin, and has a plurality of teeth 30 formed at regular intervals along the entire outer periphery thereof.

Figure 12:
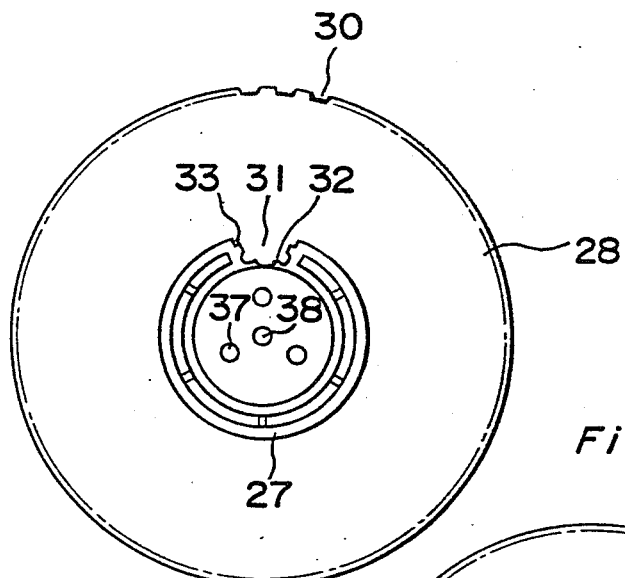
FIG. 12 is a top plan view of a lower flange of the reel.
Figure 14:
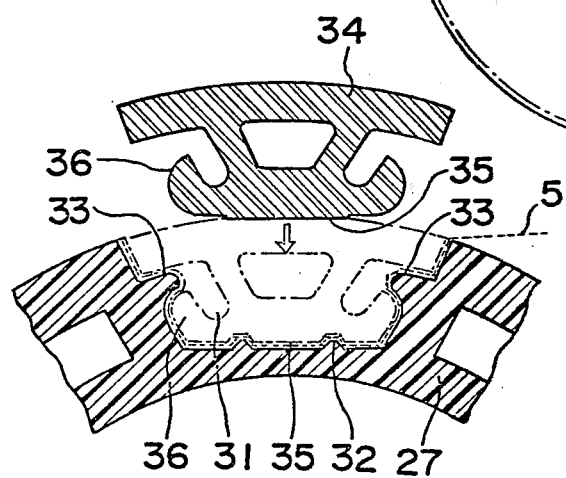
FIG. 14 is an enlarged cross sectional view of a principal part of the reel showing the condition of engagement of a tape stopper.

As shown in FIGS. 12 and 14, the hub 27 is provided in its outer periphery with a concave portion 31 opening toward the outer peripheral surface of the hub 27 for engagement with a tape stopper as hereinafter described. The concave portion 31 is provided in its bottom with one or more tape nippers 32 and in both side walls with a pair of projections 33. A tape stopper 34 to be engaged with the concave portion 31 through an end of the magnetic recording tape 5 has a lower end surface 35 which is flat at least in a portion opposite to the tape nipper 32 and a pair of elastic projections 36 having some flexibility on both sides of the lower end surface 35 (see FIG. 14). Therefore, when the tape stopper 34 is pressed into the concave portion 31 through the end of the magnetic recording tape 5, the elastic projections 36 are both inwardly pressed to be deformed and go beyond the projections 33 of the concave portion 31 respectively, thereby making the tape stopper 34 insert within the concave portion 31. Upon insertion within the concave portion 31, the tape stopper 34 is prevented from being disengaged from the concave portion 31 by function of the projections 33 as stoppers. The magnetic recording tape 5 is securely held between the tape nipper 32 and the lower end surface 35 of the taper stopper 34 by the pressing force of the tape stopper 34 and between the elastic projections 36 and the projections 33 by the elastic force of the elastic projections 36 respectively so that the end of the magnetic recording tape 5 comes in contact with the hub 27.

As shown in FIGS. 11 and 12, the hub 27 has in its upper portion bonding projections 37 for bonding the upper flange 29 to the hub 27 and a central projection 38 of the reel 6. The upper flange 29, made of transparent synthetic resin, has holes 39 for receiving the bonding projections 37 and the central projection 38 of the hub 27 (see FIG. 11). After the bonding projections 37 and the central projection 38 are inserted into the holes 39, the upper ends of the bonding projections 37 are thermally bonded to the upper flange 29 to secure the upper flange 29 to the hub 27. The central projection 38 passes through the hole 39 to project outwardly from the upper flange 29.

Figure 13:
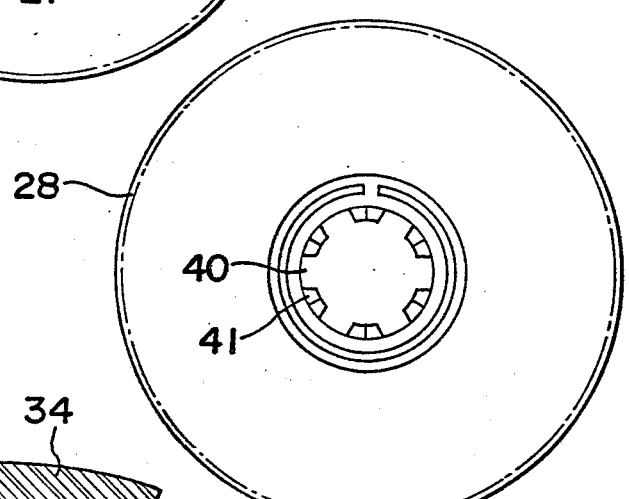
FIG. 13 is a bottom plan view of the lower flange of FIG. 12.

As shown in FIG. 13, the hub 27 has in its lower portion a concavity 40 for receiving a drive shaft of a recording/reproducing apparatus, which has a plurality of projections 41 formed at regular intervals in its periphery for transmitting driving force to the magnetic recording tape. When the reels 6 are placed in predetermined positions of the bottom section 1B, the concavities 40 of the hubs 27 are properly located on the through-holes 4 of the bottom section 1B.

Figure 15:
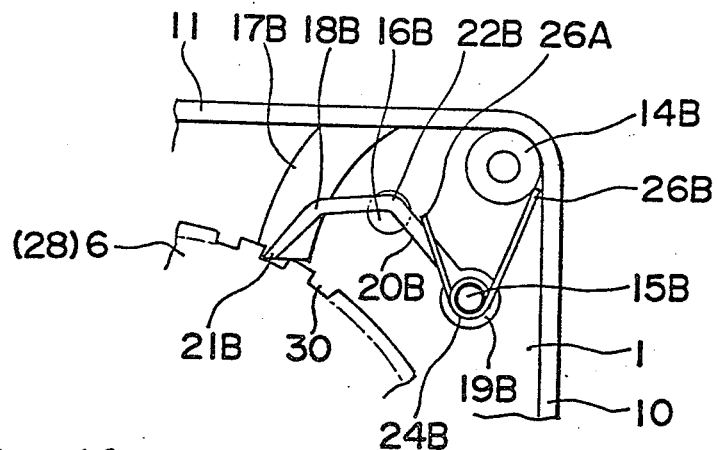
FIG. 15 is an enlarged top plan view of the member for preventing rotation of the reel in a condition the reel is prevented from rotation.

Upon placement of the reels 6 on the predetermined positions of the top section 1A, the rotation preventing member 18 and the spring member 24 are respectively engaged with the pivotal shafts 15 and the pawls 21 of the rotation preventing member 18 are engaged in the teeth 30 of the reels 6 to prevent rotation of the reels 6. In this condition, the bent portions 22 of the receiving members 20 of the rotation preventing members 18 are located above the circular holes 16, as shown in FIGS. 4, 9 and 15.

Figure 16:
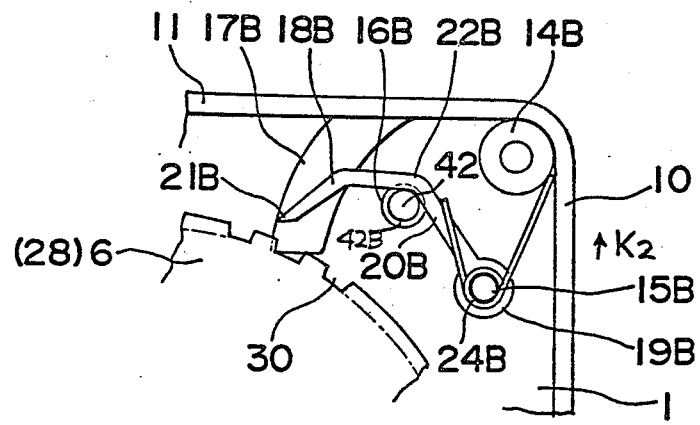
FIG. 16 is an enlarged top plan view of the member for preventing rotation of the reel in a condition the reel is allowed to rotate.
Figure 17:
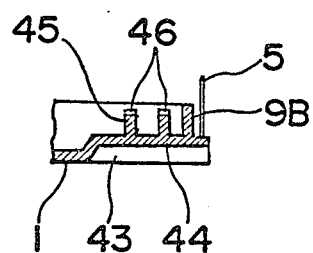
FIG. 17 is a partial cross sectional view taken along the line II—II in FIG. 4.

When the magnetic recording tape cartridge is mounted on a recording/reproducing apparatus and is lowered therein, top ends of the standard pins 42 (FIGS. 9 and 16) pass through the circular holes 16 to be in contact with the lower ends of the receiving members 20 of the rotation preventing members 18. Since the receiving members 20 are provided at their lower ends with the inclined portion 23, the receiving members 20 are pushed back by the standard pins 42 against the elastic restoring force of the spring members 24 so that the rotation preventing members 18 rotate about the pivotal shaft 15 toward the rear wall 11 of the bottom section 1B. Then the pawls 21 are disengaged from the teeth 30 of the reels 6 to release the reels 6 from being prevented from rotation (see FIG. 16).

By provision of the bent portions 22 in the receiving members 20 in portions opposite to the circular holes 16, the rotation preventing members 18 can be smoothly and securely engaged with the standard pins 42.

Further, the magnetic recording tape cartridge is properly located in a predetermined position, i.e., a standard position in the recording/reproducing apparatus by engagement of the standard pins 42 and the circular holes 16A and 16B of the bottom section 1B. In this case, the rotation preventing members 18A and 18B are respectively brought in contact with the outer peripheries of the standard pins 42 by elastic force of the spring members 24 displacing the magnetic recording tape cartridge rearwardly as shown in an arrow mark K2 in FIG. 16 to cause the opposite side 42B of the standard pin 42 to contact the inner peripheral edge of the hole 16B thereby securing proper location of the magnetic recording tape cartridge.

When the magnetic recording tape cartridge is removed from the recording/reproducing apparatus, the standard pins 42 are disengaged from the circular holes 16 so that the rotation preventing members 18 are rotated against the reels 6 by the restoring force of the spring members 24 and the pawls 21 are again engaged with the teeth in the outer peripheries of the reels 6 to prevent rotation of the reels 6.

The receiving member 20 of the rotation preventing member 18 in this embodiment is provided with the bent portion 22 which is L-shaped in plan view, though, the bent portion 22 may be Ω-shaped in plan view. Further, though the inclined portion is provided substantially along the entire length of the lower end of the receiving member 20 in this embodiment, the inclined portion 23 may be provided only in the lower end of the bent portion 22 and in the vicinity thereof.

The bottom section 1B is further provided rearwardly of the front wall 9B with a pair of supporting projections 45 extending substantially in parallel with the front wall 9B, which are respectively provided in the upper surfaces with groove-shaped bearings 46. A lock lever 47 having a rectangular portion is rotatably suspended between the supporting projections 45 by a pair of pins projecting from both sides of the lock lever, being rotatably mounted in the grooves of the bearings 46. The details of the lock lever 47 will be hereinafter described. Further, in the vicinity of the raised portion 44, there is formed a slightly elongated hole 48 for receiving a release pin which is provided in the recording-/reproducing apparatus.

Since the bearings 46 are designed to have a depth of which size is substantially identical with that of the diameter of the rotating pins 49, the rotating pins 49 are fully received in the grooves of the bearings 46 without projecting outwardly from the upper surface of the supporting projections 45. The top section 1A is provided in its inner surface also with a pair of supporting projections 62 (FIG. 30) which are opposite to the supporting projections 45 of the bottom section 1B, though, the supporting projections 62 of the top section 1A have flat lower surfaces. Upon the assembling of the top section 1A and the bottom section 1B, the rotating pins 49 are rotatably supported between the supporting projections 45 and 62 without being shaken (see FIG. 19).

Figure 18:
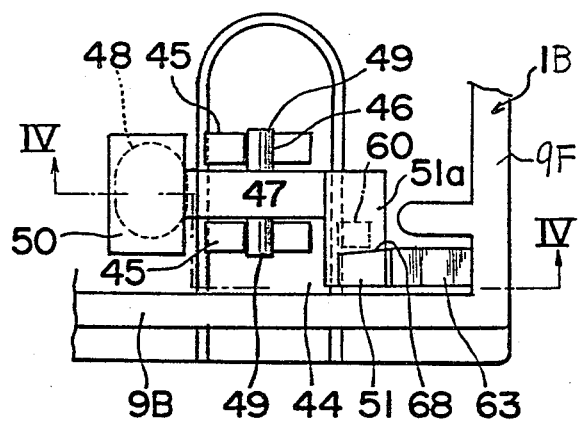
FIG. 18 is an enlarged top plan view of a part of the bottom section showing the condition of disposition of a lock lever.
Figure 19:
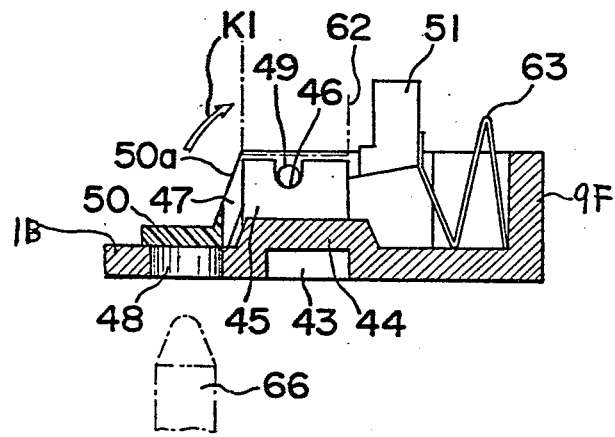
FIG. 19 is a partial cross sectional view taken along the line IV—IV in FIG. 18.
Figure 20:
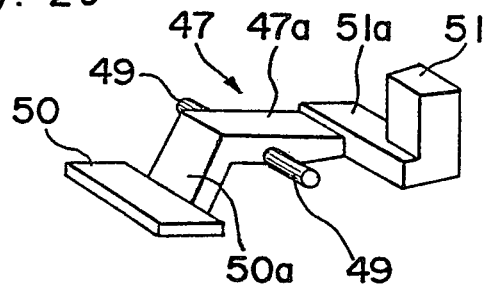
FIG. 20 is a perspective view of the lock lever.

As shown in FIGS. 18 to 20, the lock lever 47 comprises on its one end a pressing member 50 in the form of a plate which is connected with the intermediate portion 47a of the lever 47 through an inclined connecting plate 50a with the height of the pressing member 50 being lower than the intermediate portion 47a. On the other end of the lock lever 47 there is provided a stop member 51 which is projected upwardly from one end of a connecting plate 51a connected with the other end of the intermediate portion 47a.

The lock lever 47 is so suspended on the bearings 45 that the pressing member 50 is opposed just above the hole 48 defined in the bottom plate of the bottom section 1B and the stop member 51 is located near the corner defined by the front wall 9B and the connecting wall 9F. A plate spring 63 bent in the form of a bellows is inserted between the stop member 51 of the lock lever 47 and the connecting wall 9F, so that the lock lever 47 is elastically biassed by the plate spring 63 to close the elongated hole 48 by the pressing member 50. The stop member 51 of the lock lever 47 is slidably in contact with the plate spring 63 so that the stop member 51 may be inclined toward the plate spring 63 compressing the same. The lock lever 47 functions to prevent opening, i.e., rotation of the lid member 3 which now is placed in a closed condition.

As shown in FIGS. 21 to 23, the rotatable lid member 3 comprises an elongated flat front plate 52, an upper plate 53 projected in a vertical direction from the front plate 52 and a pair of end plates 54 projected from the both ends of the front plate 52 in the same direction as the upper plate 53, and the end plate 54 as shown in the left-hand direction and the other end plate 54 as shown in the right-hand direction, are respectively provided with inwardly projecting first and second pins 55 and 56. The rotatable lid member 3 is rotatably supported by the top section 1A with the pivotal pins 55 and 56 rotatably engaged in receiving holes 57 (FIG. 36) defined in both side surfaces of the top section 1A. The rotatable lid member 3 is continuously elastically biassed to a closed position by a coiled spring 65 which is loosely fitted with the first pivotal pin 55 with one bent end 64A in contact with the rotatable lid member 3 and the other bent end 64B in contact with the top section 1A.

An end of the coiled spring 65 for elastically biassing the rotatable lid member 3 to the closed position is in contact with the upper portion of the upper plate 53 of the rotatable lid member 3 in this embodiment, though, it may be in contact with the inner surface of the front plate 52 or the end plate 54 of the rotatable lid member 3.

By virtue of the aforementioned construction, the rotatable lid member 3 and the coiled spring 65 may be mounted after the top and bottom sections 1A and 1B are assembled with each other, thereby simplifying the assembling operation and preventing the magnetic recording tape from being damaged by the rotatable lid member.

As shown in FIGS. 2 and 21, a recess 58 for receiving the erroneous insertion preventing member of a recording/reproducing apparatus (not shown) is provided in the lower end of the front plate 52 of the lid member 3 in a portion opposite to the groove 43 of the bottom section 1B. Further, a pair of recesses 59 for receiving locating members (not shown) provided within a magnetic recording tape cartridge holder of the recording-/reproducing apparatus are formed in both ends of the lower portion of the front plate 52. As shown in FIGS. 22 and 23, the upper plate 53 is provided in its side with a downwardly extending hook-shaped member 60 in a portion opposite to the lock lever 47. The hook-shaped member 60 passes through a hole 61 defined in the top section 1A to extend toward the stop member 51 of the lock lever 47 (see FIGS. 1 and 25).

The operation of the rotatable lid member 3 and the lock lever 47 will hereinafter be described. In FIGS. 18, 19, 25 and 27, the rotatable lid member 3 is shown in a closed condition. As hereinabove described, the receiving hole 48 is covered by the pressing member 50 of the lock lever 47 by the pressing force of the plate spring 63. The stop member 51 is, as shown in FIG. 25, positioned ahead of the direction of rotation of the hook-shaped member 60 of the rotatable lid member 3 to prevent rotation of the same. Thus, by engagement of the stop member 51 and the hook-shaped member 60, the rotatable lid member 3 is locked in a closed position not to be opened even by external force.

Figure 26:
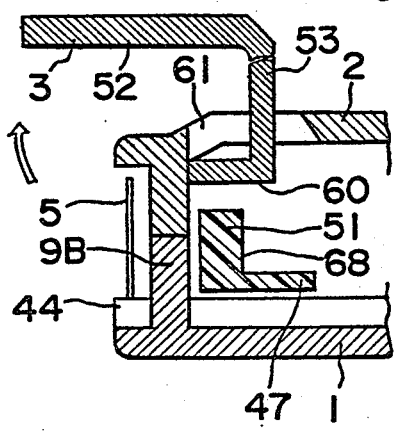
FIG. 26 is an enlarged cross sectional view of a principal part of the rotatable lid member in which the lid member is opened.

When the magnetic recording tape cartridge is mounted in the recording/reproducing apparatus, the release pin 66 (FIG. 19) is in the first place inserted into the elongated hole 48 to upwardly press the pressing member 50 against the elasticity of the plate spring 63, thereby rotating the lock lever 47 clockwise about the rotating pin 49 as indicated by an arrow mark K1 in FIG. 19. By virtue of this, the plate spring 63 is compressed and the stop member 51 is lowered as shown in FIGS. 25 and 26. Thus the stop member 51 is disengaged from the hook-shaped member 60 so that the lid member 3 is made rotatable.

Figure 27:
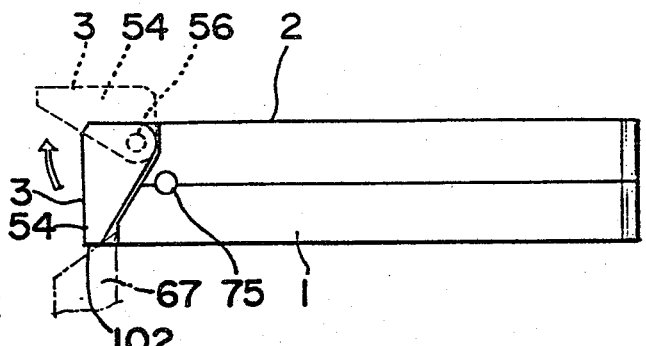
FIG. 27 is a side elevational view of the magnetic recording tape cartridge showing opening movement of the rotatable lid member.
Figure 28:
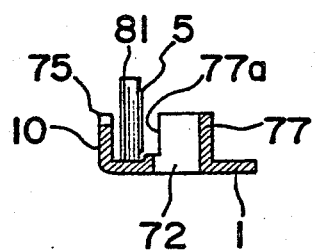
FIG. 28 is a partial cross sectional view taken along the line III—III in FIG. 4.

Then, as shown in FIG. 27, the lower end of the rotatable lid member 3 is pushed up by a lid opening member 67 to be opened against the expanding force of the coiled spring 65 which functions to close the rotatable lid member 3. When opened, the rotatable lid member 3 assumes a position indicated by the broken lines in FIG. 27.

The rotatable lid member 3 is provided in both ends of its lower surface with flat plates 102 for engaging with the lid opening member 67 so as to facilitate opening of the lid member 3 by the lid opening member 67, and each of the flat plates 102 has in the central portion a small hole 101 extending near the upper plate 53 for preventing warping deformation by contraction during molding of the end plate 54 defining the flat plate 102 (see FIG. 21).

When the magnetic recording tape cartridge is removed from the recording/reproducing apparatus, separating from the lid opening member 67, the rotatable lid member 3 is rotated to its closed position by restoring force of the coiled spring 65. On the other hand, the release pin 66 is disengaged from the elongated hole 48 of the bottom section 1B so that the stop member 51 is upwardly pressed by restoring force of the plate spring 63 forwardly of the direction of rotation of the hook-shaped member 60 to be in contact therewith while the pressing member 50 closes the open end of the elongated hole 48 to complete locking operation. The side 68 of the stop member 51 coming in contact with the hook-shaped member 60 is preferably inclined or rounded for facilitating movement of the stop member 51 ahead of the direction of rotation of the hook-shaped member 60.

Though the plate spring 63 is provided rearwardly of the stop member 51 in this embodiment, the pressing member 50 may be elastically pressed toward the elongated hole 48 by interposing a spring member such as a coiled spring between the pressing member 50 and the top section 1A.

As shown in FIGS. 2 and 4, a circular through-hole 69 is formed in the front portion of the bottom section 1B with a predetermined space from the elongated hole 48. The elongated hole 48 and the through-hole 69 make a pair to receive a location auxiliary pin (not shown) for locating the magnetic recording tape cartridge in a predetermined position within the recording/reproducing apparatus.

A hollow pin 70 is rotatably fitted outwardly of each of the bosses 14C and 14D so that the respective hollow pin 70 act to guide the magnetic recording tape 5 when it runs. As each of the bosses 14C and 14D acts as a support member of the hollow pin 70, it is advantageous that the space occupied by the taper guide members can be descreased compared to such a case where the tape guide members are provided separately from the respective bosses for the fastening screws.

Holes 72 are formed rearwardly of the hollow pins 70 to receive cylindrical light sources 71 for detecting forward and rear ends of the magnetic recording tape 5. The top section 1A is, as shown in FIG. 30, provided in positions opposite to the holes 72 of the bottom section 1B with a pair of concavities 73 for receiving the cylindrical light sources 71. Further, the side walls 10 and 74 of the top section 1A and the bottom section 1B are provided in positions opposite to the through-holes 72 and the concavities 73 with semicircular recesses 75 to define a circular hole 75 for receiving the light source 71 upon assembling of the top section 1A and the bottom section 1B as shown in FIG. 27.

When the magnetic recording tape cartridge is set in the recording/reproducing apparatus, the cylindrical light sources are inserted into the holes 72 and the concavities 73, and a light receiving element 76 having a photo diode opposite to the light source 71 is placed on the side surface of the magnetic recording tape cartridge (see FIG. 4). In operation, the magnetic recording tape 5 runs traversing between the light source and the light receiving element 76, and the forward and rear ends of the magnetic recording tape 5 are respectively connected with light-permeable leader tapes (not shown) made of polyester films.

The forward end of the magnetic recording tape 5 is detected by the cylindrical light source into the through-hole 72 existing in the left-hand portion in FIG. 4 and the light receiving element 76, and the rear end of the same is detected by the light source into the through-hole 72 existing in the right-hand portion in FIG. 4 and the light receiving element 76 respectively. That is, the forward end of the magnetic recording tape 5 is detected by the light receiving element 76 sensing an optical change of rays of light irradiated toward the leader tape and the magnetic recording tape 5 from permeation to interception, and the rear end of the magnetic recording tape 5 is detected by the light receiving element 76 sensing an optical change of said rays of light from interception to permeation. The magnetic recording tape 5 is prevented from being loosened in the vicinity of the through-hole 72 upon stoppage by being charied in a zigzag manner along the first and second guide members 80 and 81 and the hollow pin 70 in a relatively short distance, and the end of the magnetic recording tape 5 can be correctly detected simultaneously with starting thereof.

The shapes of the guide members 70, 80 and 81 can be optionally selected depending on factors such as tension on the magnetic recording tape 5 during operation.

Further, through the front inner walls 7A, 7B, 79A and 79B functioning as shielding members are provided in the top and bottom sections 1A and 1B in the embodiment, the front inner walls may be provided only in one of the sections to extend near the other section.

As seen from the embodiment, no particular light shielding wall is required by virtue of the inner walls surrounding the outer peripheries of the reels to restrict the positions thereof serving also as shielding members, thereby simplifying the construction, saving the space and diminishing the size of the magnetic recording tape cartridge.

As explained in the embodiment, the shield wall 77 is formed around the through-hole for receiving the light source or the light receiving element with the window formed in a part opposing to the light penetrating hole, and the shield wall is integrally connected with the inner walls by reinforcing ribs to increase mechanical strength of the shield wall and the inner walls, improve fludity of the synthetic resin within the mold in forming and prevent the shield wall and the inner walls from being deformed when removed from the mold after forming so that the walls effectively shield the light.

By virtue of the aforementioned construction, the outside light passing through the window is prevented by the inner walls of the cartridge case from entering the light path defined between the light source and the light receiving element, and thus the forward and rear ends of the magnetic recording tape can be precisely optically detected to provide a reliable magnetic recording tape cartridge.

Figure 29:
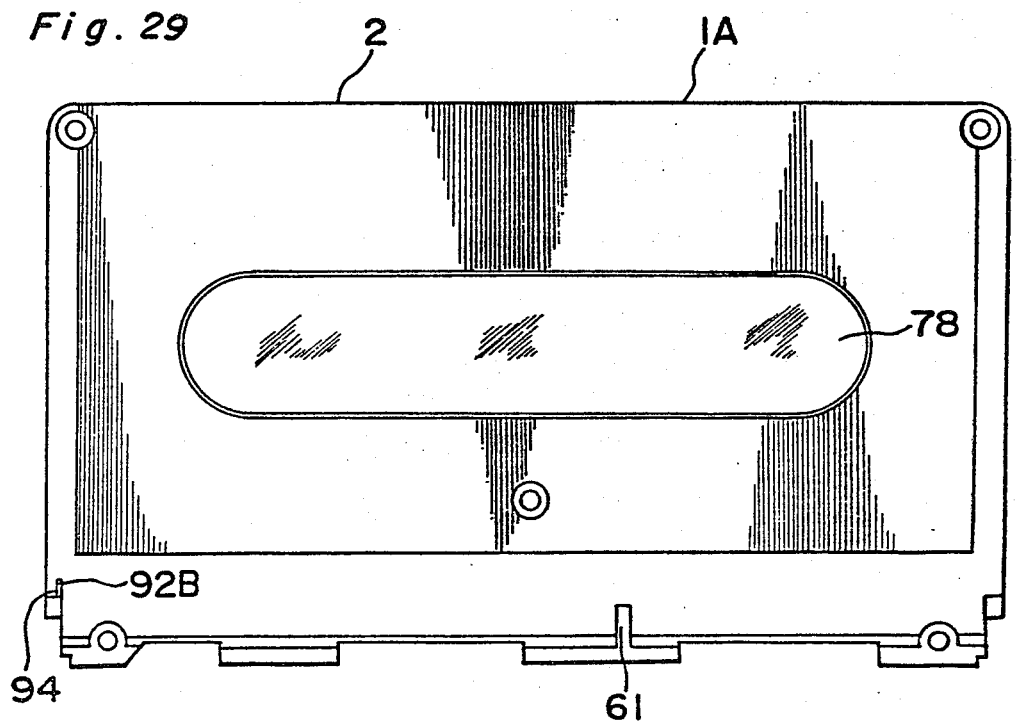
FIG. 29 is a top plan view of the top section.

As shown in FIGS. 29 and 30, the window 78 for comprehending the amount of tape 5 wound on the respective reels 6 is formed by a relatively long transparent synthetic resin plate extending over both reels 6. By this arrangement, the condition of the magnetic recording tape 5 in use is precisely comprehended by examining the difference in volume of windings of the tape 5 between the retracting reel 6 and the take up reel 6, for reducing the number of parts of the window 78 and the processes of mounting the same to the top section 1B and for a requirement in design. In this embodiment, therefore, the spring plate 84 is provided between the window 78 and the rear wall 85 of the upper case 2 as shown in FIG. 30.

Figure 32:
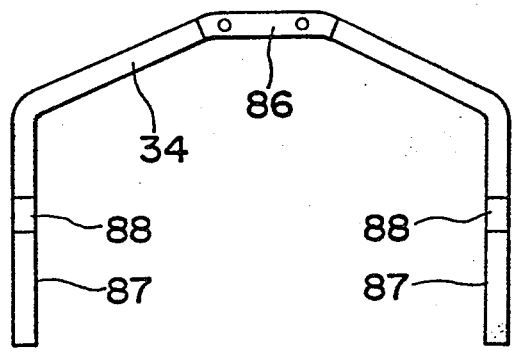
FIG. 32 is a top plan view of a spring plate.
Figure 33:
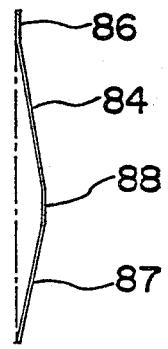
FIG. 33 is a side elevational view of the spring plate.

A generally U-shaped spring plate 84 is secured to the bottom face of the top section 1A to press the both of the reels 6 toward the bottom section 1B. Said spring plate 84 is made of, for example, a thin plate of stainless steel, substantially U-shaped in plan view as shown in FIGS. 30 and 32, and comprises a central base portion 86 and a pair of pressing members 87 extending toward the reels 6. The pressing members 87 have flat portions 88 coming in contact with pointed ends of the central projections 38 of the reels 6. As shown in FIG. 30, the top section 1A has in its inner surface opposite to the spring plate 84 a shallow recess 89 for widening the allowable range of vertical movement of the spring plate 84.

Figure 34:
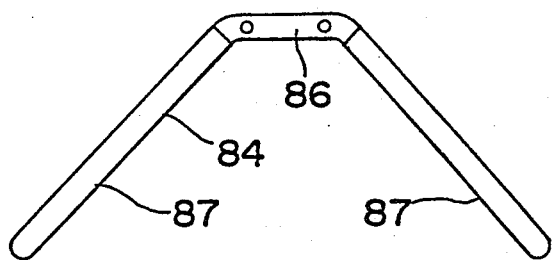
FIG. 34 is a top plan view of a modified spring plate.
Figure 35:
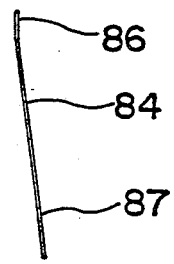
FIG. 35 is a side elevational view of the modified spring plate of FIG. 34.

FIGS. 34 and 35 respectively show a modification of the spring plate 84, which is generally V-shaped in plan view.

Figure 31:
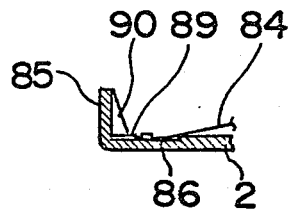
FIG. 31 is a cross sectional view taken along the line VII—VII in FIG. 30.

Since the spring plate 84 is provided between the window 78 and the rear wall 85 of the top section 1A, there is no space to form a central rear wall for controlling location of the reels 6 in the top section as provided in the prior art, such control wall is provided in the bottom section 1B as hereinabove described. By this arrangement, the central portion of the rear wall 85 of the top section 1A may be weak in view of shock-proof property and tends to be deformed when the top section 1A is removed from a mold after the molding of the top section is completed, and thus the rear wall 85 is integrally provided in its interior with reinforcing ribs 90 (see FIGS. 30 and 31).

The order of assembling of the magnetic recording tape cartridge as hereinabove explained will be hereinafter described.

The retracting reel 6 and the take-up reel 6 are placed on the bottom section 1B and the magnetic recording tape 5 is set thereon in a predetermined condition. Then the top section 1A is placed (FIG. 36) to be assembled with the bottom section 1B and fastened together by the tapping screws 82.

Apart from this, a coil-like portion 91 of the coiled spring 65 for elastically pressing the rotatable lid member 3 is loosely fitted with the first pivotal pin 55 of the rotatable lid member 3. As shown in FIG. 3B, the coiled spring 65 comprises a pair of free ends horizontally extending from both sides of the coil-like portion 91 to define downwardly bent end portions 64A and 64B. As hereinabove described, the coil-like portion 91 of the coiled spring 65 is loosely fitted with the first pivotal pin 55 and one bent end portion 64A is inserted into a hole 92A formed in the end of the upper plate 53 of the rotatable lid member 3 whereby the other bent end portion 64B is upwardly manually raised against elasticity of the coiled spring 65.

Figure 37:
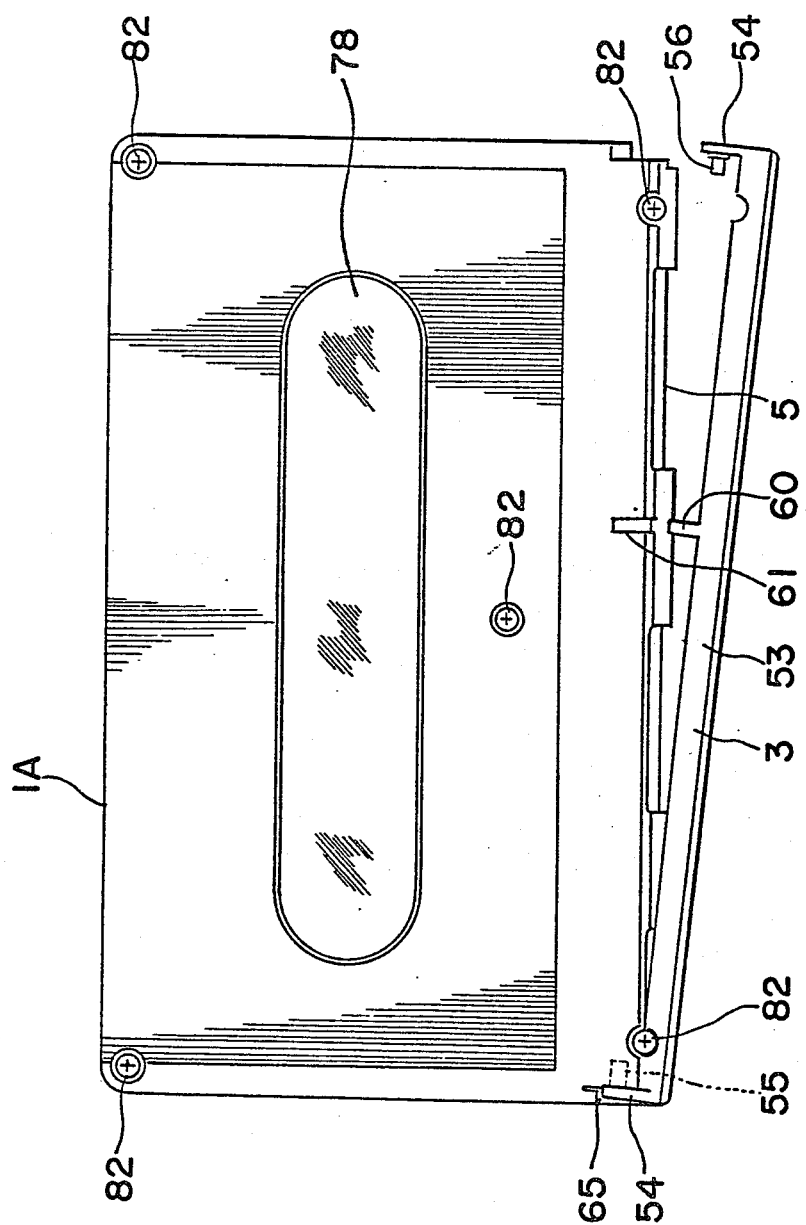
FIG. 37 is a top plan view of the magnetic recording tape cartridge showing a way of assembling the rotatable lid member.
Figure 38:
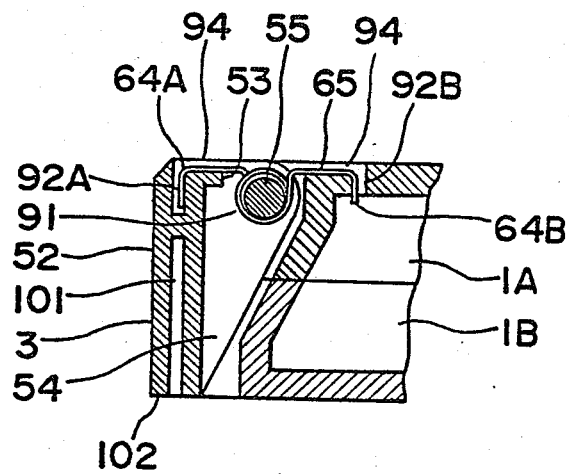
FIG. 38 is a partial enlarged cross sectional view of a principal part of the magnetic recording tape cartridge showing engagement of the cartridge case and the rotatable lid member.

Under this condition, the first pivotal pin 55 of the rotatable lid member 3 is inserted into the supporting hole 57 formed in the side wall 74 of the top section 1A as shown in FIG. 37 and said other bent end portion 64B of the coiled spring 65 is inserted into a hole 92B formed in the upper surface of the top section 1B (see FIGS. 29 and 38).

Figure 36:
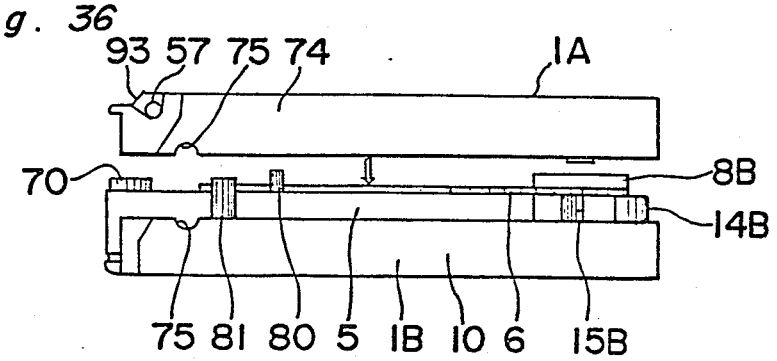
FIG. 36 is a side elevational view of the magnetic recording tape cartridge showing assembling thereof.
Figure 39:
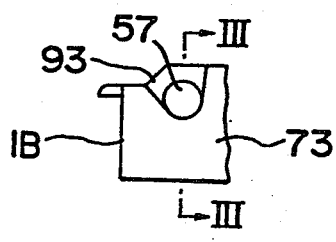
FIG. 39 is an enlarged side elevational view of a part of the top section in the vicinity of a supporting hole.
Figure 40:
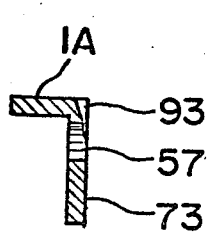
FIG. 40 is a cross sectional view taken along the line VIII—VIII in FIG. 39.

Then the rotatable lid member 3 is slightly bent and the second pivotal pin 56 is inserted into another supporting hole 57 formed in the side wall 74 of the top section 1A. For facilitating smooth insertion of the second thread pin 56, the rotatable lid member 3 may be made of acryl-nitryl synthetic resin such as copolymer of acryl nitryl styrene and copolymer resin of acryl nitryl-butadiene-styrene to have flexibility, and as shown in FIGS. 36, 39 and 40, a guide groove 93 may be provided from the end of the side wall 73 of the top section 1A toward the supporting hole 57. The guide groove 93 is, as shown in FIG. 40, inclined at the bottom so that the side near the end of the side wall 73 of the top section 1A is made deeper than the side near the supporting hole 57.

The second pivotal pin 56 is engaged in the supporting hole 57 so that the downwardly extending hook-shaped member 60 formed in the rotatable lid member 3 is inserted into the interior of the cartridge case through the hole 61 formed in the top section 1A. Thus, the rotatable lid member 3 can be rotatably mounted on the top section 1A and is biassed to the closed position by the restoring force of the coiled spring 65. On the other hand, the free end of the hook-shaped member 60 thus inserted in the interior of the top section 1A is engaged with the rear end of the stop member 51 thereby causing the lid member 3 to be locked in the closed position. Thus, assembling of the magnetic recording tape cartridge is completed.

In the vicinity of the holes 92A and 92B, there are respectively formed receiving grooves 94 for securely retaining the coiled spring 65 extending from the rotatable lid member 3 over the top section 1A in the predetermined position so that it does not project beyond the upper surfaces of the rotatable lid member 3 and the top section 1A. Since no projection member is formed on the outer peripheries of the pivotal pins 55 and 56, the pins 55 and 56 may be inserted into the supporting holes 57 after the top and bottom sections 1A and 1B are assembled each other in the aforementioned manner.

When the magnetic recording tape cartridge is not in use, the magnetic recording tape 5 is somewhat raised at the substantially central portion being exposed in the front surface of the cartridge case by the raised portion 44 of the bottom section 1B so that the magnetic tape 5 is prevented from being loosened as shown in FIG. 3. When the magnetic recording tape cartridge is set in the recording/reproducing apparatus, the reels 6 are somewhat raised upwardly against the elasticity of the spring plate 84 by the drive shaft inserted into the concavity 40 of the reel 6, and the magnetic recording tape 5 is moved upwardly following thereto, so that the bottom edge of the magnetic recording tape 5 is separated from the raised portion 44. The magnetic recording tape 5 tends to widely move vertically especially when running along the front surface of the cartridge case, through, provision of the raised portion 44 controls the vertical movement of the magnetic recording tape 5 to facilitate stable running of the tape and prevent the ends of the magnetic recording tape from being damaged by the vertical vibration.

Further, when the inner wall encircling the outer periphery of the reel for restricting the position of the same is utilized as a partition wall for preventing scraps of synthetic resin from entering into the region of location of the reel, no special partition wall is required to simplify the construction and save the space, thereby facilitating diminishment in size of the magnetic recording tape cartridge.

By virtue of the aforementioned construction, the scraps of synthetic resin are effectively prevented from entering the region in which the reel is located, and thus the magnetic recording tape is protected from damage by the scraps and the recording/reproducing characteristic is improved by the present invention.

Though the embodiment is shown with respect to a reel-to-reel type magnetic recording tape cartridge, the present invention can be applied to an endless type magnetic recording tape cartridge.

What is claimed is:

1. A magnetic recording tape cartridge comprising:
   (a) a bottom section and a top section assembled together by a plurality of tapping screws so as to provide a cartridge case having a front wall, top plate, bottom plate and a tape chamber with a plurality of openings formed in said front wall,
   (b) a pair of tape reels juxtaposed in said tape chamber for receiving a magnetic recording tape to be wound around said tape reels, each of the tape reels rotatably mounted relative to a drive shaft insertion hole defined in said bottom plate of said bottom section of said cartridge case,
   (c) a column-like boss member projected from the central portion of one of said plates of said top section or bottom section, said boss member having a screw insertion hole for threadedly receiving one of said tapping screws, and
   (d) a partition wall member projected from one of said plates in a space between said column-like boss member and the peripheral edges of said pair of reels to provide a chamber for enclosing scraps produced from said column-like boss member during insertion of said tapping screw into the hole of said column-like boss member so as to prevent the scraps from damaging said magnetic recording tape wound around said tape reels.

2. A magnetic recording tape cartridge according to claim 1, wherein said partition wall member comprises a wall member provided on one of said plates, extending along a semicircular configuration conforming to a part of the peripheral edges of said tape reels so as to serve as a guide means for said tape reels.

3. A magnetic recording tape cartridge comprising:
   (a) a bottom section and a top section assembled together by a plurality of tapping screws so as to provide a cartridge case having a front wall, top plate, bottom plate and a tape chamber with a plurality of openings formed in said front wall,
   (b) a pair of tape reels juxtaposed in said tape chamber for receiving a magnetic recording tape to be wound around said tape reels, each of the tape reels rotatably mounted relative to a drive shaft insertion hole defined in said bottom plate of said bottom section of said cartridge case,
   (c) a column-like boss member projected from the central portion of one of said plates of said top section or bottom section, said boss member having a screw insertion hole for threadedly receiving one of said tapping screws, and
   (d) a partition wall member projected from one of said plates in a space between said column-like boss member and the peripheral edges of said pair of reels to provide a chamber for enclosing scraps produced from said column-like boss member during insertion of said tapping screw into the hole of said column-like boss member so as to prevent the scraps from damaging said magnetic recording tape wound around said tape reels, said partition wall member being provided with at least one auxiliary rib projected from one of said plates with one end connected with the column-like boss member.

4. A magnetic recording tape cartridge according to claim 3, wherein said column-like boss member is surrounded by a cylindrical wall member with a height greater than the column-like boss member.

* * * * *